United States Patent [19]

Medlin

[11] Patent Number: 4,899,319
[45] Date of Patent: Feb. 6, 1990

[54] METHOD FOR DETERMINING INDUCED FRACTURE AZIMUTH IN FORMATIONS SURROUNDING A CASED WELL

[75] Inventor: W. L. Medlin, Dallas, Tex.

[73] Assignee: Mobil Oil Corporation, New York, N.Y.

[21] Appl. No.: 192,446

[22] Filed: May 11, 1988

[51] Int. Cl.⁴ .............................................. G01V 1/40
[52] U.S. Cl. ....................................... 367/35; 367/31; 181/105
[58] Field of Search ....................... 367/28, 29, 30, 31, 367/32, 35; 181/105

[56] References Cited

U.S. PATENT DOCUMENTS

| | | | |
|---|---|---|---|
| Re. 24,446 | 3/1958 | Summers | 181/5 |
| 3,333,238 | 7/1967 | Caldwell | 340/18 |
| 3,356,177 | 12/1967 | Loren | 181/0.5 |
| 3,362,011 | 1/1968 | Zemanek, Jr. | 340/18 |
| 4,383,308 | 5/1983 | Caldwell | 367/31 |
| 4,432,077 | 2/1984 | Alhilali et al. | 367/31 |
| 4,575,828 | 3/1986 | Williams | 367/31 |
| 4,649,525 | 3/1987 | Angona et al. | 367/31 |
| 4,674,067 | 6/1987 | Zemanek, Jr. | 367/25 |
| 4,683,557 | 7/1987 | Willis | 367/57 |
| 4,715,019 | 12/1987 | Medlin et al. | 367/31 |
| 4,718,046 | 1/1988 | Medlin | 367/31 |
| 4,809,237 | 2/1989 | Vogel et al. | 367/35 |

OTHER PUBLICATIONS

"Underground Sound," J. E. White, Elsevier Press, N.Y., 1983, Chapter 5, pp. 139-191.
"The Correlation of Tube Wave Events with Open fractures in Fluid-Filled Boreholes", C. F. Huang and J. A. Hunter, Current Research, Part A, Geological Survey of Canada, Paper 81-1A, pp. 361-376, 1981.
U.S. Patent Application Ser. No. 189,880, filed 5/3/88, W. L. Medlin, Mobil Docket No. 4763 is incorporated herewith.

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

An acoustic logging tool traverses a fluid-filled cased well with an asymmetric acoustic energy transducer. Pressure waves created in the well fluid by the transducer generate asymmetric tube waves in the well casing. At least one spaced-apart transducer receives these asymmetric tube waves after they have traveled directly to the receiver through the well casing. Changes in tube wave ampltiude as detected by the receiver are used to identify the azimuth and height of any fracture interval in the formation behind the well casing.

4 Claims, 6 Drawing Sheets

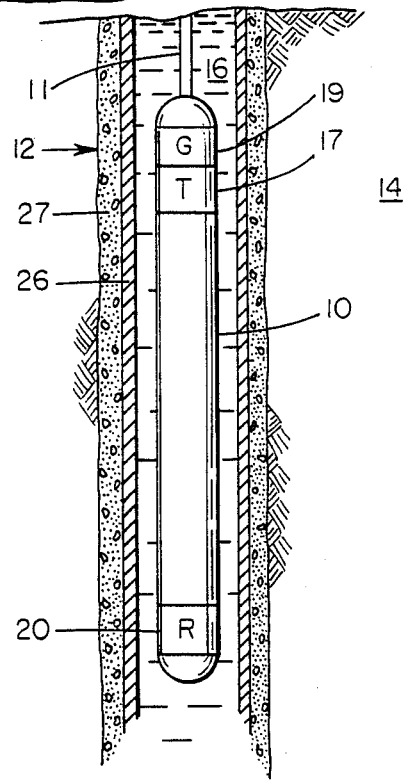
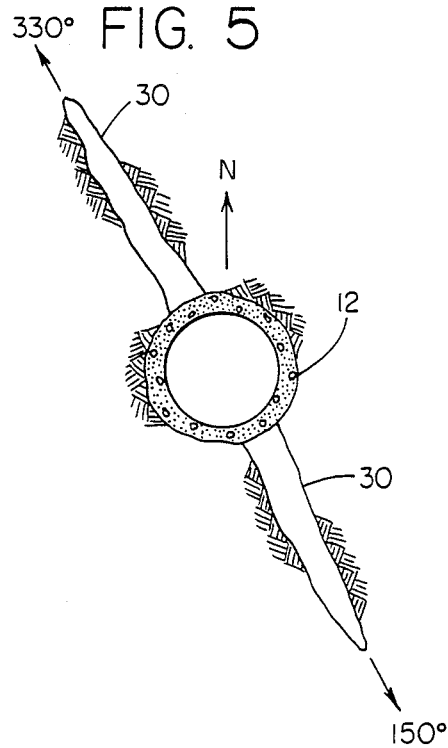
FIG. 1
FIG. 5

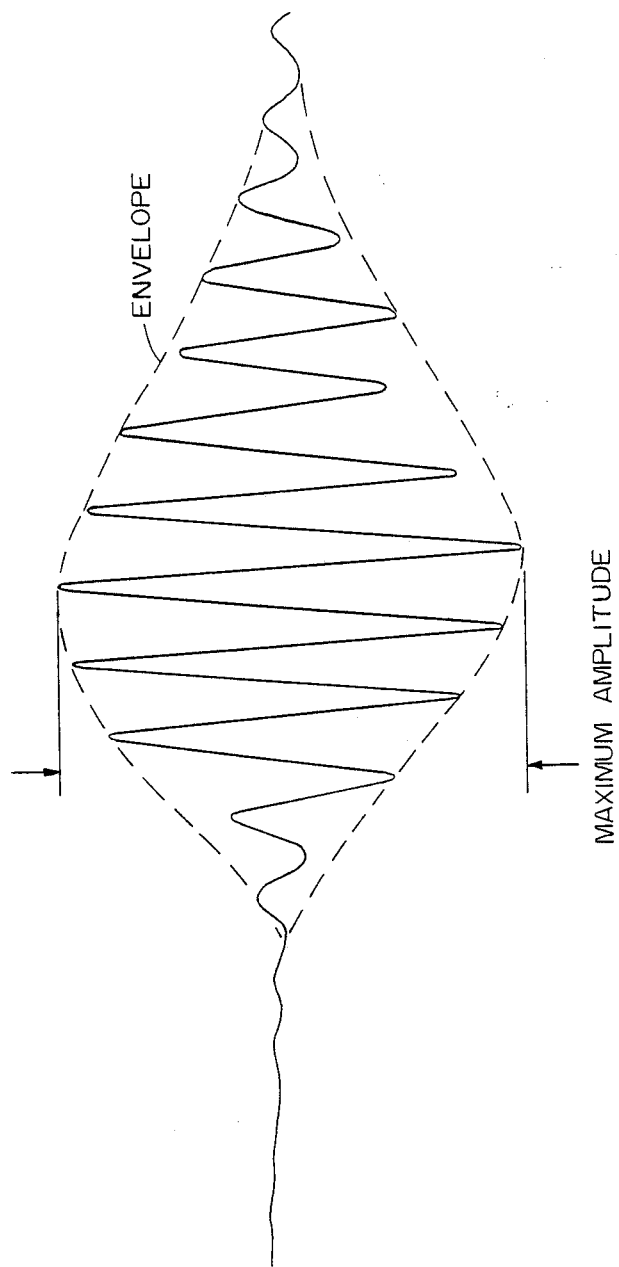

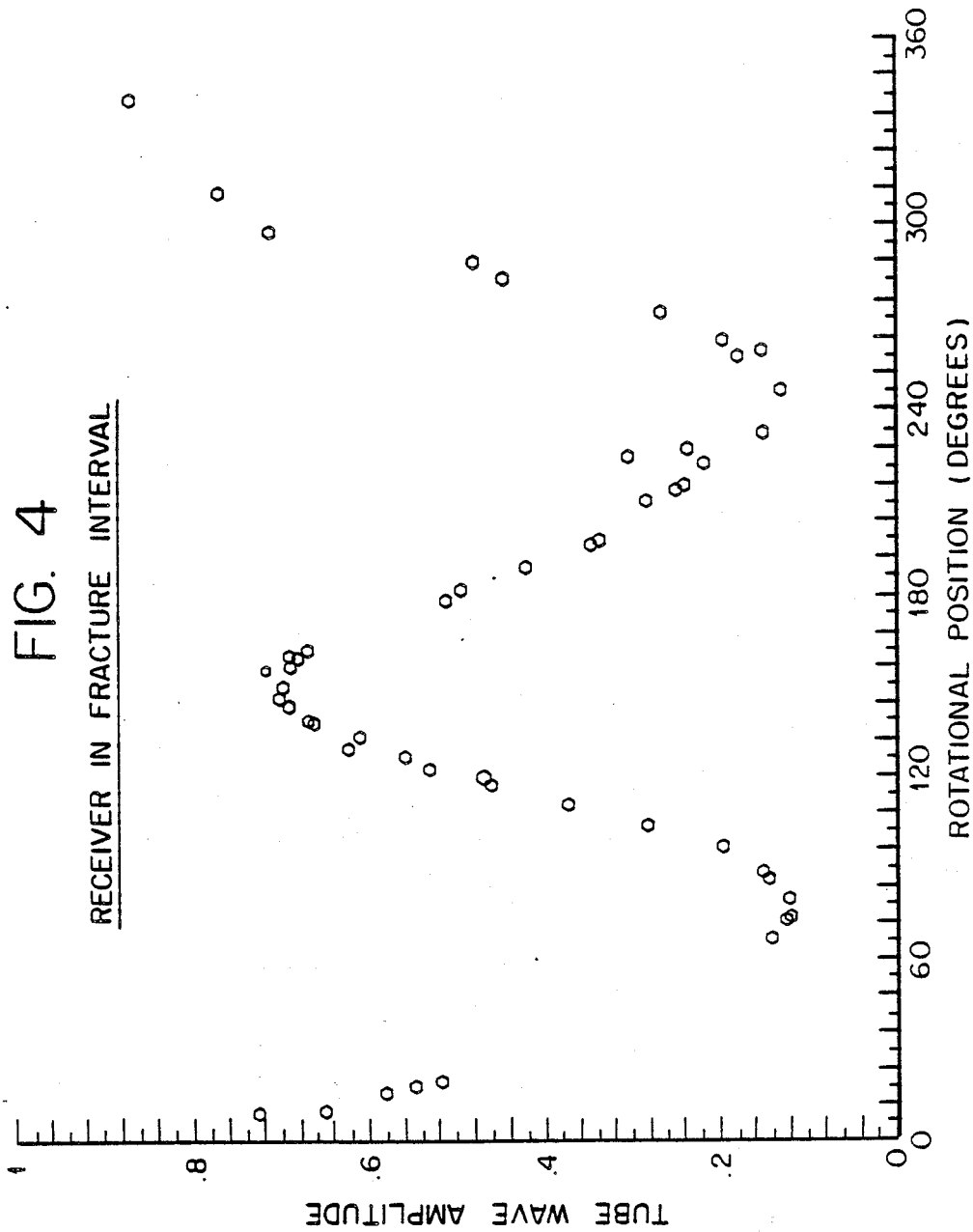

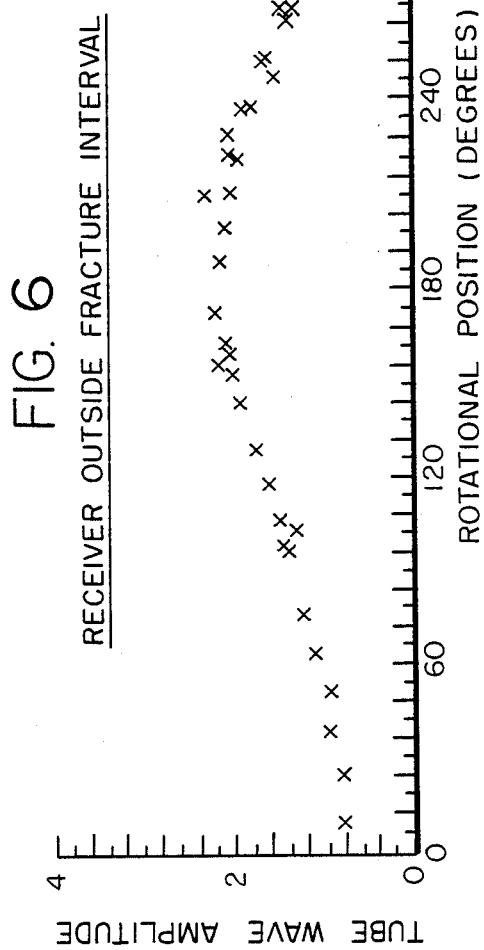

METHOD FOR DETERMINING INDUCED FRACTURE AZIMUTH IN FORMATIONS SURROUNDING A CASED WELL

BACKGROUND OF THE INVENTION

The present invention relates in general to a method for acoustic well logging and, more particularly, to a method for detecting the presence of hydraulically induced fractures behind well casing and determining their azimuthal orientation.

It has long been known to acoustically log open wellbores to determine the velocities of compression ("P") waves and shear ("S") waves traveling through rock formations located in the wellbore region and tube waves ("T") traveling along the wellbore interface. Logging devices have been used for this purpose which normally comprise a sound source (transmitter) and one or more receivers disposed at pre-selected distances from the sound source.

By timing the travel of compression waves, shear waves, and/or tube waves between the transmitter and each receiver, it is normally possible to determine the nature of surrounding rock formations including natural fracture identification. For descriptions of various logging techniques for collecting and analyzing compression wave, shear wave, tube wave, and secondary wave data, please refer to U.S. Pat. Nos. 3,333,238 (Caldwell); 3,356,177 (Loren); 3,362,011 (Zemanek, Jr.); Reissue No. 24,446 (Summers); 4,383,308 (Caldwell) and 4,715,019 (Medlin et al); and to "The Correlation of Tube Wave Events With Open Fractures In Fluid-Filled Boreholes" by Huang and Hunter in Geological Survey of Canada, pgs. 336-376, 1981.

In each of the foregoing references, the acoustic waves are generated in the formation in response to an acoustic energy transmission from within an open wellbore. However, the teachings of such references are not applicable to the identification of induced fractures in formations which are traversed by well casing, that is, well pipe cement bonded to the formation. An acoustic transmitter within the cased well generates tube waves which travel along the casing surface. These casing tube waves are the predominant mode of wellbore excitation at low frequencies. Their amplitudes are orders of magnitude greater than those of compressional or shear waves generated in the casing or formation. In cemented intervals the casing tube waves can be sensitive to changing conditions behing the casing.

It is therefore a specific objective of the present invention to provide for a method of logging a cased well to detect hydraulically induced fractures in the formations surrounding the cased well and to specify their azimuthal orientation.

SUMMARY OF THE INVENTION

In accordance with the present invention there is provided a method of acoustic well logging for detecting hydraulically induced intervals behind well casing. More particularly, a fluid-filled cased well is traversed with a well logging tool containing an asymmetric acoustic energy transducer for producing a positive pressure wave in the fill-fluid in one direction and a negative pressure wave in the fill-fluid in an opposite direction. The transducer is excited either by a transient high voltage pulse or by a short duration tone burst of fixed frequency which causes it to vibrate at a resonant frequency, thereby producing positive and negative pressure waves in the fill-fluid. The impact of the pressure waves against the casing of the well causes the casing to deflect and produce asymmetric tube waves in the casing. These asymmetric tube waves travel along the casing and are received at a spaced-apart position within the cased well by one or more receivers sensitive to asymmetric tube waves. The received tube waves are recorded and processed by conventional methods to obtain the waveform produced by each excitation of the transmitter. Typically, these waveforms appear as more or less symmetric wavelets of 5-10 millisecond duration. The envelope of each wavelet has a certain maximum amplitude which is to be used as the measure of tube wave amplitude.

This tube wave amplitude is sensitive to the presence of a propped fracture in the formation rock adjacent to the casing. It is largest when the asymmetric tube wave is centered on the plane of the fracture and smallest 90° away. The effect is generally large, typically producing a 4-5 fold change in tube wave amplitude between the extreme values. This sensitivity to fracture location makes it possible to determine fracture orientation behind casing from asymmetric tube wave logging measurements.

In a further aspect, the logging tool is rotated as it traverses the cased well and the azimuthal direction of a fracture interval intersected by the well is identified from the pair of rotational position of the logging tool at which the tube wave amplitude passes through maxima. The depth of the logging tool is also recorded as the logging tool traverses the well and the height of a fracture interval is identified from the recorded depths over which the received tube wave amplitude is strongly sensitive to tool rotation.

BRIEF DESCRIPTION OF THE DRAWINGS

FIG. 1 illustrates an acoustic well logging system employed in carrying out the asymmetric tube wave logging method of the present invention in a cased well.

FIG. 2 illustrates the waveform of the asymmetric tube wave recorded by the receiver in the system of FIG. 1 for a single source excitation.

FIG. 4 illustrates a plot of tube wave amplitude versus azimuthal angle as obtained from log data like that of FIG. 3 in a hydraulically fractured interval.

FIG. 5 illustrates the fracture orientation depicted by the log data shown in FIGS. 3 and 4.

FIG. 6 illustrates a plot of tube wave amplitude versus azimuthal angle at a fixed depth in an interval not hydraulically fractured.

DESCRIPTION OF THE PREFERRED EMBODIMENT

Figure 3:
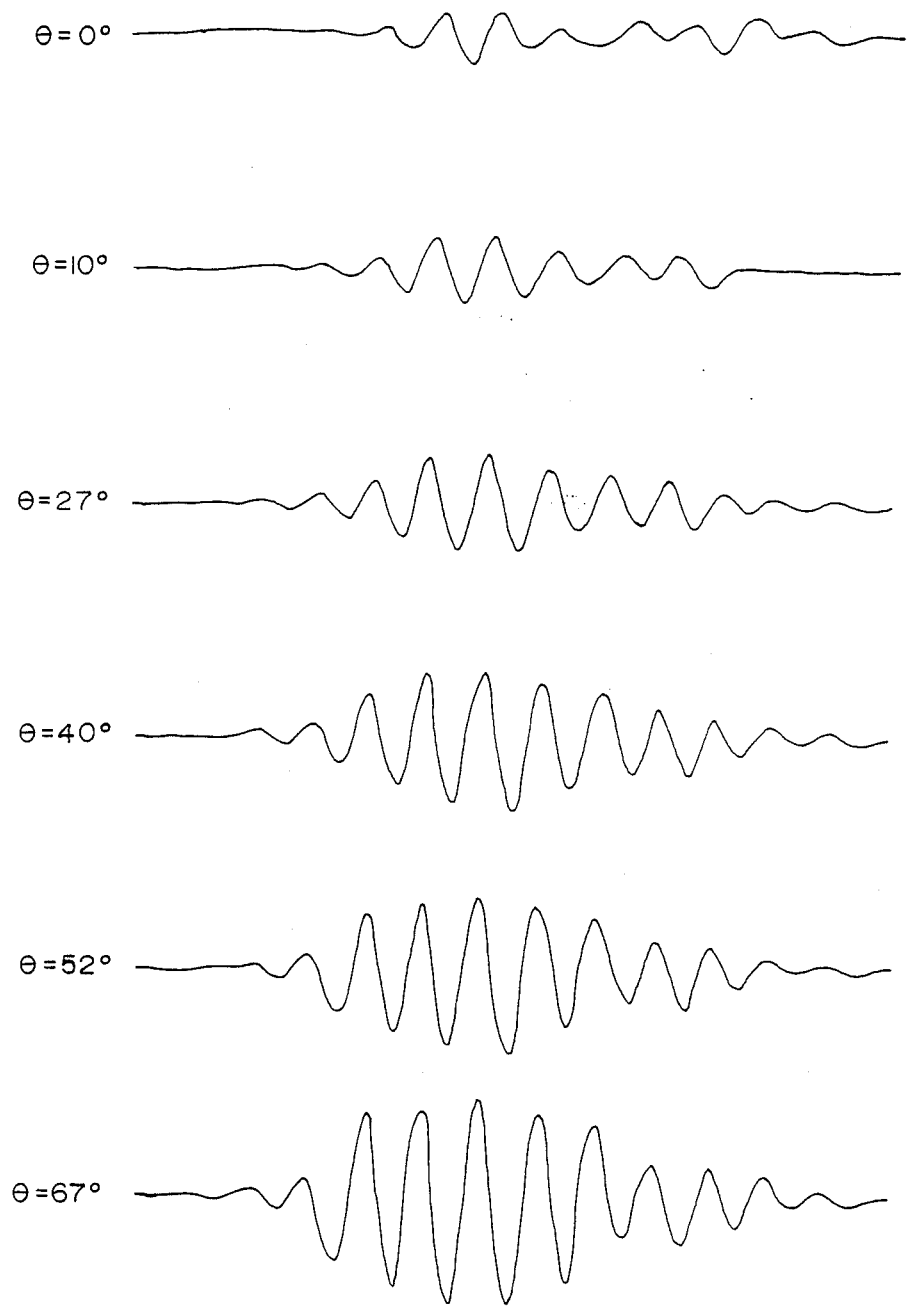
FIG. 3 illustrates a sequence of waveforms obtained by rotating the system of FIG. 1 in arbitrary azimuthal angular steps at a fixed depth within a hydraulically fractured interval.

The present invention is directed to a method for generating asymmetric tube waves in well casing and measuring amplitude changes in such tube waves as they travel along the well casing to identify hydraulically induced fracture intervals behind the well casing.

Referring now to FIG. 1, there is illustrated an acoustic logging system that is used in accordance with the present invention for generating and receiving asymmetric acoustic tube waves in well casing. The logging system includes an elongated logging tool 10 which is suspended from a cable 11 within a cased well 12 which traverses a subsurface formation of interest 14. The cased well 12 is filled with a fluid, such as drilling mud 16. The logging tool comprises an acoustic transmitter 17 a gyroscope system 19 and an acoustic receiver 20. Signals from the logging tool 10 are transmitted uphole by conductors within cable 11 to any suitable utilization system at the surface. For example, the utilization system is illustrated as comprising an uphole analysis and control circuit 22 and recorder 24 in order that the output from circuit 22 may be correlated with depth.

Having set forth the well logging system of FIG. 1 for generating and receiving acoustic energy within a cased well, the method of the present invention for use of such a system to identify hydraulically induced fractures in the formation surrounding the casing will now be described.

Transmitter 17 is utilized to generate asymmetric acoustic energy imparting a positive pressure wave in one direction in the well fill-fluid and a simultaneous negative pressure pulse in the opposite direction in the well fill-fluid. The source is excited either by a transient, high-voltage pulse or by a fixed -frequency, sine wave tone burst of 3-5 cycles applied across its active elements. In logging operations, the source is excited repetitively at a rate which is typically in the range 10-100 per second. After each excitation the positive and negative pressure waves of the generated asymmetric acoustic energy cause simultaneous outward and inward deflections respectively of the well casing on opposite sides of the well. These deflections traverse down the well casing as asymmetric tube waves and are detected at a spaced apart position within the well casing by one or more receivers that are sensitive to asymmetric acoustic energy.

Each excitation of the source produces a wavelet of asymmetric tube wave energy at the receiver. The envelope of this wavelet has a certain maximum amplitude which can be used as a measure of the amplitude of the asymmetric tube wave. A typical example is shown in FIG. 2. Hereafter, the term "tube wave amplitude" will be understood to mean the maximum amplitude of this envelope.

As the logging tool is rotated and advanced through the cased well, the tube wave amplitude changes little, provided there are no induced fractures present. As the tool is advanced into a zone containing an induced fracture, the tube wave amplitude begins to go through large systematic variations. This is illustrated in FIG. 3 which shows a sequence of waveforms obtained during rotation at a fixed depth in an interval containing an induced fracture.

The maximum tube wave amplitude occurs when the path of the asymmetric tube wave in the casing is aligned with the plane of the induced fracture. As the tool is rotated through 360°, two maxima are produced. They correspond to the plane of the induced fracture. The orientation of the dipole receiver at each maximum gives the azimuth of the fracture plane.

Source orientation is given by the gyroscope system 19 in FIG. 1. By suitable calibration at the surface, this system provides source orientation relative to magnetic north, while the logging tool is advanced and rotated in the cased well. From the dipole source orientation, the azimuth of the asymmetric tube wave path can be specified. Plots of tube wave amplitude versus source orientation are used to determine the asimuth of the induced fracture. This is illustrated in FIG. 4 which shows logging data obtained in a cased well following a hydraulic fracturing treatment in a limestone interval. These data were obtained by rotating the logging tool manually in small arbitrary increments at a fixed depth in the fractured interval. The tube wave amplitude goes through maxima at about 150° and 330° where magnetic north corresponds to 0° or 360°. Based on these results, the induced fracture is shown to extend from the wellbore in a direction 30° W of N and 30° E of S. This fracture orientation is illustrated in FIG. 5 which is a top view of cased well 12 with a hydraulically induced fracture extending from it.

In contrast to the plot of FIG. 4, there is little dependence of tube wave amplitude on tool orientation below and above the fractured interval. This is illustrated in FIG. 6 which shows data obtained with the tool located at a shallower depth above the fractured interval. In this case, the tube wave amplitude changes little with tool rotation.

Thus, by correlating tube wave amplitude with rotational position of the transmitter and receiver, the azimuthal direction of a fracture is identified. In a further aspect, by identifying the interval on the recorded log over which the asymmetric tube wave amplitude shows strong dependence on tool orientation, the height of the fractured interval behind the well casing is readily determined since the recorder 24 is correlated with depth.

Transmitter 17 and receiver 20 preferably take the form of either a bender-type or a flexure disc-type transducer. Bender-type transducers are, in themselves, well known and take the form described by Sheridan, C. A., et al., in "Bender Bar Transducers For Low-Frequency Underwater Sound Sources", presented at the 97th Meeting of the Acoustical Society of America, Cambridge, Mass., June 15, 1979. Such a transducer is supplied by Honeywell Defense Electronics Division, Seattle, Wash., as Model HX-8B. A flexure disc-type transducer is described in U.S. Pat. No. 3,363,118 to C. C. Sims. Such a transducer is supplied by Actran Systems, Orlando, Fla. A particularly suitable bender bar transducer for use in an acoustic wellbore logging tool of the present invention is described in U.S. Pat. Nos. 4,516,228 to Zemanek, Jr.; 4,649,525 to Angona and Zemanek, Jr.; and 4,715,019 to Caldwell, the teachings of which are incorporated herein by reference. Briefly, the bender bar transducer described in such patents employ two piezoelectric elements which flex outward and inward together to produce a positive pressure wave in the wellbore fluid in the direction of such outward flexing and a simultaneous negative pressure wave in the direction of such inward flexing. Such a bender transducer is designed to have a number of characteristic resonance frequencies between a few hundred Hz and several kHz, such as from about 100 Hz to about 50 kHz. In response to the application of either a transient high voltage pulse or an alternating current tone burst of fixed frequency, the bender transducer will resonate at a single one of such characteristic resonant frequencies. The tone burst is preferably a sine wave driving current of about three to five cycles. Commercial devices are available for generating sine wave tone bursts, such as a Model 7060 Generator, supplied by Exact Electronics, Hillsboro, Oreg. with a Model MC 2500 Power Amplifier, supplied by McIntosh Laboratory, Binghamton, N.Y.

The gyroscope system 19 preferably takes the form of a directional gyroscope which delivers a DC voltage whose magnitude is proportional to the angular rotation from a pre-selected direction determined from a magnetic compass setting at the surface. One example is a DC voltage increasing from 0 to 3.60 V as the tool is rotated clockwise through 360° starting from an azimuth of magnetic north. A commercial device which functions in this way is Model DG 29-0700 directional gyroscope supplied by Humphrey, Inc., 9212 Balboa Ave., San Diego, CA.

As noted above, acoustic borehole logging for induced formation fractures behind well casing has been limited. In accordance with the present invention, acoustic tube waves are generated within the well casing by energizing an asymmetric acoustic transducer within the well casing, such as the bender transducer, so as to cause such transducer to vibrate at a resonant frequency. Asymmetric tube waves are in turn generated in the well casing due to deflection of the well casing from impact of the positive and negative pressure waves created in the wellbore fill-fluid by the bender transducer.

Having now described a preferred embodiment of the present invention, it will be apparent to those skilled in the art of acoustic well logging that various changes and modifications may be made without departing from the spirit and scope of the invention as set forth in the appended claims.

I claim:

1. A method of acoustic well logging for identifying formation fracture intervals behind a cased well comprising the steps of:
    (a) traversing a fluid-filled cased well with a well logging tool containing an asymmetric acoustic energy transducer for producing a positive pressure wave in the fill-fluid in one direction and a negative pressure wave in the fill-fluid in an opposite direction,
    (b) rotating said logging tool as it traverses said cased well
    (c) exciting said transducer with a plurality of tone bursts on fixed frequency to drive said transducer to resonate and produce the positive and negative pressure waves in the fill-fluid, the impact of said pressure waves against the casing of said well causing said casing to deflect and produce asymmetric cased well tube waves which travel within said casing,
    (d) receiving said asymmetric tube waves at a spaced apart position within said cased well by one or more receivers sensitive to said asymmetric cased well tube waves,
    (e) recording the amplitudes of said received cased well tube waves, and
    (f) identifying the azimuthal direction of a fracture interval intersected by said cased well from the rotational position of said logging tool at which there is an increased amplitude in said received cased well tube waves.

2. A method of acoustic well logging for identifying formation fracture intervals behind a cased well comprising the steps of:
    (a) traversing a fluid-filled cased well with a well logging tool containing an asymmetric acoustic energy transducer for producing a positive pressure wave in the fill-fluid in one direction and a negative pressure wave in the fill-fluid in an opposite direction,
    (b) recording the depth of said logging tool as it traverses the cased well, and
    (c) exciting said transducer with a plurality of tone bursts of fixed frequency to drive said transducer to resonate and produce the positive and negative pressure waves in the fill-fluid, the impact of said pressure waves against the casing of said well causing said casing to deflect and produce asymmetric cased well tube waves which travel within said casing,
    (d) receiving said asymmetric tube waves at a spaced apart position within said cased well by one or more receivers sensitive to said asymmetric cased well tube waves,
    (e) recording the amplitudes of said received cased well tube waves, and
    (f) identifying the height of a fracture interval from the recorded depths over which said received cased well tube waves exhibit increased amplitude.

3. A method for logging fractures in subsurface formations penetrated by a cased well having well casing including well pipe cement bonded to the wellbore wall, comprising the steps of:
    (a) filling said cased well with a fill-fluid,
    (b) traversing said fluid-filled cased well with a transmitter and at least one spaced-apart receiver of acoustic energy,
    (c) rotating said transmitter as it traverses said cased well,
    (d) energizing said transmitter to produce asymmetric acoustic energy pressure waves in said fill fluid which cause said well casing to deflect and produce asymmetric cased well tube waves that travel along said well casing,
    (e) detecting said asymmetric tube waves at said at least one receiver after said cased well tube waves have traveled directly to said receiver through said well casing,
    (f) identifying changes in the amplitudes of said detected cased well tube waves, and
    (g) identifying the azimuthal direction of a formation fracture intersected by said cased well by correlating the amplitude changes in said cased well tube waves with the rotational position of said transmitter and receiver.

4. The method of claim 3 further including the step of identifying the height of a formation fracture intersected by said cased well by correlating the amplitude changes in said cased well tube waves with the depth of said transmitter and receiver in said cased well.

* * * * *